Patented Aug. 21, 1951

2,565,278

UNITED STATES PATENT OFFICE 2,565,278

MODIFIED UREA-FORMALDEHYDE RESINS AND PROCESSES OF PREPARING THE SAME

Tzeng Jiueq Suen, Stamford, Conn., and Arthur M. Schiller, Astoria, N. Y., assignors to American Cyanamid Company, New York, N. Y., a corporation of Maine No Drawing. Application February 11, 1950, Serial No. 143,832

14 Claims. (Cl. 260—67.5)

This invention relates to novel water soluble urea-formaldehyde resins modified with amino substituted heterocyclic nitrogen compounds, and more specifically, with amino substituted pyridines. This invention further relates to water soluble amino-pyridine modified urea-formaldehyde resins, which are useful for the treatment of paper, textiles, and leather. This invention further relates to methods of preparing the above described resins and, more particularly, to those resins in which the modifier is 2-amino-pyridine, 3-amino-pyridine, or 4-amino-pyridine or mixtures of the same.

One of the objects of the present invention is to produce a water soluble urea-formaldehyde resin, which has been modified with an amino substituted pyridine. A further object of the present invention is to produce a water soluble amino-pyridine modified urea resin which may be used in the treatment of paper whereby the wet strength of said paper is considerably enhanced by the treatment of the paper with the resins of the present invention. A still further object of the present invention is to produce amino-pyridine modified urea-formaldehyde resins which are adaptable for use in the treatment of textiles and leather. These and other objects of the present invention will be discussed in greater detail hereinbelow.

The modified urea-formaldehyde resins of the present invention are water soluble and cationic and may be applied in a number of fields where the unmodified resin is not particularly suitable. The amino-pyridine urea-formaldehyde resins of the present invention have a number of applications which, when so used, produce novel, unusual, and unexpected results in comparison to the results realized when the unmodified resins are so used. The uses of these resins will be discussed more fully hereinbelow.

In the preparation of these water soluble urea-formaldehyde resins, the modifier may be any of the amino-pyridines and specifically, 2-amino-pyridine, 3-amino-pyridine, or 4-amino-pyridine or mixtures of any or all of these amino pyridines. The actual amount of amino-pyridine used to modify the urea-formaldehyde resins is comparatively critical and on a mol ratio basis, one must use not less than 0.02 mol and not more than 0.3 mol of the amino-pyridine per mol of urea. It is preferred to use between 0.05 mol to 0.1 mol per mol of urea.

In the preparation of these modified urea resins, urea is reacted with formaldehyde or any one of the materials capable of engendering formaldehyde, such as paraformaldehyde, hexamethylenetetramine and the like. When formaldehyde per se is used, it should be used in aqueous solution in a mol ratio of about 1.5 to 3 mols of formaldehyde per mol of urea. It is preferred to use, for optimum results, mol ratios of 2–2.5 mols of formaldehyde per mol of urea. When materials capable of engendering formaldehyde are used, the same mol equivalents should be used.

In the preparation of the resins in the present invention, one may react the urea and formaldehyde and, subsequently, add the amino-pyridine and then cause a coreaction between the urea-formaldehyde reaction product and the amino-pyridine, or one may incorporate all three components into the reaction chamber at the outset and cause the coreaction of the reagents. During the initial phase of the reaction, in either instance it is desired to control the pH of the reacting mixture on the alkaline side or more specifically at a pH between 7 and 10. It is preferred, however, that the pH be controlled during the initial reaction between about 7.5 and 9.5. This initial reaction can be conducted at temperatures varying between about 65° C. and reflux (about 100° C.). Temperatures between room temperature (25° C.) and 65° C. may be used but the reaction time is necessarily prolonged thereby. It is preferred, however, to conduct this initial reaction between about 70° C. and 85° C. The period of time for heating in the initial stage is not particularly critical and may vary between about 15 minutes and several hours, such as 2 or 3 hours or longer. After this initial reaction has been completed, the pH may be adjusted, by the addition of an acidic material, to the acid side such as at a pH of about 1 to about 6.5 and the reaction temperature adjusted to 25° C.–100° C. The reaction mixture may be heated further or cooled depending on the pH of the particular solution, and aged until the desired viscosity is reached. If the pH of the reaction mixture is comparatively high on the acid side, such as 4.5–6.5, one may wish to maintain a temperature within the range of about 65° C. and reflux (100° C.) but if the pH of the reaction mixture is comparatively low, such as about 1–3, it is preferred that the reaction mixture be cooled to a temperature of about 25° C. (room temperature) to about 45° C. With moderate pH values, such as 3 to 4.5, one may cool to a temperature within the range of 45–65° C. When the reaction mixture is undergoing treatment in the acid stage the viscosity will increase at a comparatively gradual rate and the viscosity should be so controlled that a 45% solids solution of the resin in water is within the range of B–S on the Gardner-Holdt scale at 25° C. The viscosity increase may then be arrested by neutralization.

For certain applications, e. g., imparting wet strength to paper by beater addition, the performance of the resin will be affected by the viscosity of the resin syrup. The wet strength will increase as the viscosity increases to a certain point. After a certain viscosity value is reached, the wet strength will be relatively independent of the viscosity. The storage stability of the resin syrup, of course, is also affected by the viscosity. As a general rule, the higher the viscosity, the poorer the stability will be and vice versa.

In order to illustrate more specifically the process for the preparation of these modified urea resins, the following example is set forth wherein all parts are parts by weight. It must be remembered that this example is set forth purely for the purpose of illustration and is not intended to be interpreted as a limitation on the case except as indicated in the appended claims.

*Example 1*

120 parts of urea are dissolved in 365 parts of a 37% aqueous formaldehyde solution in a suitable reaction chamber. The pH of the solution is adjusted to about 9.2 with a 10% sodium hydroxide solution and the mixture is allowed to react at about 70–80° C. for 30 minutes. 12 parts of 2-amino-pyridine are added to the reaction mixture whereupon the pH of the mixture is adjusted to about 5.2 by the addition of 14 parts of a 17.7% aqueous hydrochloric acid solution. The mixture is then refluxed for about 2 hours. The reaction mixture is then cooled to room temperature (25° C.) and the pH is adjusted to about 2.0 by the addition of additional quantities of 17.7% aqueous hydrochloric acid. The resinous mixture is then aged at 25° C. until the viscosity of a 45% solids resin solution was about H on the Gardner-Holdt scale at 25° C. The resin solution is then neutralized by the addition of a 50% aqueous solution of triethanolamine to a pH of 7.0.

The resin syrup thus produced is miscible with water. When bleached kraft pulp was treated with the resin in the amount of about 3% of resin solids on the basis of the dry pulp weight and made into sheets of 50 lbs. basis weight (25" x 40" x 500) and heated at 100–105° C. for 1 minute. Wet tensile strength was found to be 4.2 lbs. per inch, which strength could be increased to 6.6 lbs. per inch upon ageing. This ageing of the resin in the treated hand sheets is accomplished by giving the hand sheet an extra cure of about 10 minutes in an oven at 260° F. before testing. The corresponding dry tensile strength of the paper after the regular cure and the extra cure was 24.7 lb. per inch respectively.

In addition to using the resins of the present invention in the treatment of paper to impart wet strength thereto, these resins may be used in the treatment of leather, in the treatment of textile materials such as to improve shrinkage control, to impart crease resistance, to impart insecticidal and fungicidal properties to said textile materials, and in the treatment of non-fibrous regenerated cellulosic materials.

When the resins of the present invention are to be used for purposes other than paper treatment, there is no need to control the pH on the acid side nor is it necessary to cause any increase in viscosity such as to the desired range set forth above.

We claim:

1. A process for preparing a water-soluble urea resin comprising reacting urea, formaldehyde and an amino-pyridine under alkaline conditions in a mol ratio of 1:1.5:0.2 and 1:3:0.3 respectively, wherein said amino-pyridine is selected from the group consisting of 2-amino-pyridine, 3-amino-pyridine and 4-amino-pyridine.

2. A process for preparing a water-soluble urea resin comprising reacting urea, formaldehyde and an amino-pyridine by heating under alkaline conditions at a temperature between room temperature and reflux, then reacting under acid conditions at a temperature between room temperature and reflux, wherein the mol ratio of urea, formaldehyde and amino-pyridine is within the range of 1:1.5:0.02 and 1:3:0.3 respectively, wherein said amino-pyridine is selected from the group consisting of 2-amino-pyridine, 3-amino-pyridine and 4-amino-pyridine.

3. A process for preparing a water-soluble urea resin comprising reacting urea, formaldehyde and an amino-pyridine by heating under alkaline conditions at a temperature between room temperature and reflux, then reacting under acid conditions at a temperature between room temperature and reflux, wherein the mol ratio of urea, formaldehyde and amino-pyridine is within the range of 1:2:0.05 and 1:2.3:0.1 respectively, wherein said amino-pyridine is selected from the group consisting of 2-amino-pyridine, 3-amino-pyridine and 4-amino-pyridine.

4. A process for preparing a water-soluble urea resin comprising reacting urea, formaldehyde and an amino-pyridine by heating under alkaline conditions at a temperature between 70° and 85° C., then reacting under acid conditions at a temperature between 70° and 85° C., wherein the mol ratio of urea, formaldehyde and amino-pyridine is within the range of 1:1.5:0.02 and 1:3:0.3 respectively, wherein said amino-pyridine is selected from the group consisting of 2-amino-pyridine, 3-amino-pyridine and 4-amino-pyridine.

5. A process for preparing a water-soluble urea resin comprising reacting urea, formaldehyde and an amino-pyridine under alkaline conditions at a temperature between 65° C. and reflux, then reacting under acid conditions at a temperature between room temperature and reflux until the viscosity of a 45% resin solids solution in water is between B and S on the Gardner-Holdt scale at 25° C., wherein the mol ratio of the urea, formaldehyde and amino-pyridine is within the range of 1:1.5:0.02 and 1:3:0.3, respectively, wherein said amino-pyridine is selected from the group consisting of 2-amino-pyridine, 3-amino-pyridine and 4-amino-pyridine.

6. A process for preparing a water-soluble urea resin comprising heating urea, formaldehyde, and an amino-pyridine at a pH of 7.5–9.5 at a temperature between 70° C. and 85° C., then reacting under acid conditions at a temperature between room temperature and reflux until the viscosity of a 45% resin solids solution in water is between B and S on the Gardner-Holdt scale at 25° C., wherein the mol ratios of the urea, formaldehyde, and amino-pyridine is within the range of 1:2:0.05 and 1:2.3:0.1, respectively, wherein said amino-pyridine is selected from the group consisting of 2-amino-pyridine, 3-amino-pyridine and 4-amino-pyridine.

7. A process for preparing a water soluble urea resin comprising heating urea, formaldehyde and 2-amino-pyridine under alkaline conditions at a temperature between 65° C. and reflux, then reacting under acid conditions at a temperature between room temperature and reflux until the viscosity of a 45% resin solids solution in water is between B and S on the Gardner-Holdt scale at 25° C., wherein the mol ratios of the urea, formaldehyde, and 2-amino-pyridine is within the range of 1:1.5:0.02 and 1:3:0.3, respectively.

8. A process for preparing a water soluble urea resin comprising heating urea, formaldehyde and 3-amino-pyridine under alkaline conditions at a temperature between 65° C. and reflux, then reacting under acid conditions at a temperature between room temperature and reflux until the viscosity of a 45% resin solids solution in water is between B and S on the Gardner-Holdt scale, wherein the mol ratios of the urea, formaldehyde, and 3-amino-pyridine is within the range of 1:1.5:0.02 and 1:3:0.3, respectively.

9. A process for preparing a water-soluble urea resin comprising reacting urea, formaldehyde, and 4-amino-pyridine under alkaline conditions at a temperature between 65° C. and reflux, then reacting under acid conditions at a temperature between room temperature and reflux until the viscosity of a 45% resin solids solution in water is between B and S on the Gardner-Holdt scale at 25° C. wherein the mol ratio of the urea, formaldehyde and 4-amino-pyridine is within the range of 1:1.5:0.02 and 1:3:0.3, respectively.

10. A water-soluble amino-pyridine modified urea-formaldehyde resin having a mol ratio of from 0.02:1:1.5 to 0.3:1:3, respectively, wherein said amino-pyridine is selected from the group consisting of 2-amino-pyridine, 3-amino-pyridine and 4-amino-pyridine.

11. A water-soluble amino-pyridine modified urea-formaldehyde resin having a mol ratio of from 0.05:1:2.0 to 0.1:1:2.3, respectively, wherein said amino-pyridine is selected from the group consisting of 2-amino-pyridine, 3-amino-pyridine and 4-amino-pyridine.

12. A water-soluble 2-amino-pyridine modified urea-formaldehyde resin having a mol ratio of from 0.02:1:1.5 to 0.3:1:3, respectively.

13. A water-soluble 3-amino-pyridine modified urea-formaldehyde resin having a mol ratio of from 0.02:1:1.5 to 0.3:1:3, respectively.

14. A water-soluble 4-amino-pyridine modified urea-formaldehyde resin having a mol ratio of from 0.02:1:1.5 to 0.3:1:3, respectively.

TZENG JIUEQ SUEN.
ARTHUR M. SCHILLER.

REFERENCES CITED

The following references are of record in the file of this patent:

UNITED STATES PATENTS

| Number | Name | Date |
|---|---|---|
| 2,214,067 | Petersen | Sept. 10, 1940 |